US009489751B2

(12) United States Patent
Ohta

(10) Patent No.: US 9,489,751 B2
(45) Date of Patent: Nov. 8, 2016

(54) IMAGE PROCESSING APPARATUS AND IMAGE PROCESSING METHOD FOR COLOR CORRECTION BASED ON PIXEL PROXIMITY AND COLOR SIMILARITY

(71) Applicant: OMRON Corporation, Kyoto (JP)

(72) Inventor: Takashi Ohta, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/930,377

(22) Filed: Nov. 2, 2015

(65) Prior Publication Data

US 2016/0267686 A1    Sep. 15, 2016

(30) Foreign Application Priority Data

Mar. 12, 2015  (JP) ................. 2015-049959

(51) Int. Cl.
  *G06K 9/00* (2006.01)
  *G06T 11/00* (2006.01)
  *G06T 1/00* (2006.01)
  *G06T 7/00* (2006.01)

(52) U.S. Cl.
  CPC ......... *G06T 11/001* (2013.01); *G06K 9/00281* (2013.01); *G06T 1/0007* (2013.01); *G06T 7/0081* (2013.01); *G06K 9/00268* (2013.01); *G06T 2207/10024* (2013.01); *G06T 2207/30201* (2013.01)

(58) Field of Classification Search
  CPC ............... G06K 9/00268; G06K 9/00281; G06T 2007/30201
  USPC ....................................... 382/167
  See application file for complete search history.

(56) References Cited

U.S. PATENT DOCUMENTS 7,369,699 B1 * 5/2008 Christie ............... H04N 1/6027
                                                    382/163
7,587,083 B2 * 9/2009 Tabata .................... G06T 5/008
                                                    382/162

(Continued)

FOREIGN PATENT DOCUMENTS

| EP | 2720190 A1   | 4/2014  |
| JP | H11-120336 A | 4/1999  |
| JP | 2012-190287 A| 10/2012 |
| JP | 2012-256130 A| 12/2012 |

OTHER PUBLICATIONS

Extended European Search Report issued in corresponding European Application No. 15191276.3, mailed on Jul. 7, 2016 (6 pages).

(Continued)

*Primary Examiner* — Yubin Hung
(74) *Attorney, Agent, or Firm* — Osha Liang LLP

(57) ABSTRACT

An image processing apparatus comprises an image acquiring unit configured to acquire a face image including a face of a person; a lip extracting unit configured to extract a lip region from the face image; a color determining unit configured to determine a representative color of the lip based on pixels included in the lip region; a value acquiring unit configured to acquire a first value representing a proximity to the lip region and a second value correlated to similarity of a color to the representative color; a generating unit configured to generate, based on distributions of the first and second values, a lip correction map representing a distribution of weights used in correcting a color of the lip included in the face image; and an image correcting unit configured to correct the color of the lip using the lip correction map.

8 Claims, 8 Drawing Sheets

(56) References Cited

U.S. PATENT DOCUMENTS

| | | | |
|---|---|---|---|
| 2006/0280362 A1* | 12/2006 | Umeda | G06K 9/0061 382/167 |
| 2013/0343647 A1* | 12/2013 | Aoki | H04N 1/62 382/165 |
| 2014/0185931 A1 | 7/2014 | Aoki | |
| 2015/0145882 A1* | 5/2015 | Nguyen | H04N 1/622 345/589 |

OTHER PUBLICATIONS

Notification of Preliminary Rejection issued in corresponding Korean Application No. 10-2015-0147889, mailed on Aug. 9, 2016 (12 pages).

* cited by examiner

IMAGE PROCESSING APPARATUS AND IMAGE PROCESSING METHOD FOR COLOR CORRECTION BASED ON PIXEL PROXIMITY AND COLOR SIMILARITY

CROSS-REFERENCE TO RELATED APPLICATION

This application is based on Japanese Patent Application No. 2015-049959 filed with the Japan Patent Office on Mar. 12, 2015, the entire contents of which are incorporated herein by reference.

BACKGROUND OF THE INVENTION

1. Field of the Invention

The present invention relates to an image processing technique for correcting a color of a lip.

2. Description of the Related Art

In recent years, a technique for automatically correcting an image including a face of a person (a face image) photographed using a digital camera or the like is becoming more common. Correcting a color tone of a lip is an example of such a technique. By detecting a lip from a face image and correcting a color tone of the lip, an effect as if lipstick is applied can be obtained, and it is therefore possible to improve appearance.

As the technique for correcting a color of a lip, for example, there is an image processing apparatus described in Japanese Patent Application Laid-Open No. 2012-190287. The image processing apparatus acquires a representative color of the lip on the basis of a face image and specifies, on the basis of the acquired representative color of the lip, a region that should be corrected.

SUMMARY OF THE INVENTION

In a method described in Japanese Patent Application Laid-Open No. 2012-190287, a region where a lip is present (hereinafter, lip region) is specified on the basis of a color of the lip and correction is applied to the region. However, since there is an individual difference in the color of the lip, the lip region cannot always be accurately specified.

For example, when there are a person having a wide reddish region of a lip and a person having a narrow reddish region of a lip and both the persons have the same size the lips, the lip of the former person is recognized as larger.

The present invention has been devised in view of the above problems and it is an object of the present invention to provide a technique for more naturally correcting a color of a lip included in an image.

The present invention in its one aspect provides an image processing apparatus comprises an image acquiring unit configured to acquire a face image, which is an image including a face of a person; a lip extracting unit configured to extract a lip region, which is a region corresponding to a lip, from the face image; a representative-color determining unit configured to determine a representative color of the lip on the basis of pixels included in the lip region; a value acquiring unit configured to acquire, for each pixel included in the face image, a first value representing a proximity to the lip region and a second value correlated to similarity of a color to the representative color; a lip-correction-map generating unit configured to generate, on the basis of distributions of the first values and the second values, a lip correction map representing a distribution of weights used in correcting a color of the lip included in the face image; and an image correcting unit configured to correct the color of the lip included in the face image using the lip correction map.

The image processing apparatus according to the present invention is an apparatus that generates a map (a lip correction map) used in correcting a color of a lip included in a face image. The lip correction map is a map representing the intensity of correction used in correcting the color of the lip.

After generating a lip region, which is a region corresponding to the lip, and a representative color, which is a color representing the lip, on the basis of the face image, which is an input image, the generation of the lip correction map is performed by using the lip region and the representative color.

Specifically, after a value (first value) representing the proximity to the lip region and a value (second value) correlated to similarity between the representative color and a color are calculated for each pixel, a distribution of the first values and a distribution of the second values are integrated to generate the lip correction map. Each of the second values may be the similarity between the representative color and the color or may be, for example, a value obtained by multiplying the similarity by a weight.

In this way, the image processing apparatus according to the present invention performs correction of an image using the lip correction map generated with reference to both of the distances and the colors. Therefore, it is possible to perform more natural correction compared with when the correction is performed at uniform intensity and when the correction is performed on the basis of only the distances or the colors.

Each of the second values may be a value obtained by multiplying the similarity of the color to the representative color by a predetermined weight, and the predetermined weight may increase as an intensity of a component of red of a target pixel increases.

Each of the second values may be simple similarity to the representative value but may be a value corrected to be larger as a hue of the target pixel is closer to red. Consequently, since pixels corresponding to the lip have a reddish color, it is possible to further highlight the lip.

Each of the first values may be a value that is attenuated as the target pixel is further away from the lip region, and the attenuation inside a mouth may be steeper than the attenuation outside the mouth.

Each of the first values can be a value that is attenuated as the target pixel is further away from the lip region. However, a probability of presence of the lip in a place apart from the lip region is higher inside the mouth than outside the mouth. Therefore, the attenuation rate inside the mouth is set higher than the attenuation rate outside the mouth. With such a configuration, it is possible to more naturally perform correction.

The image correcting unit may combine a predetermined correction color and hues of pixels of the face image using a weight defined in the lip correction map.

By combining the hue of the target pixel and the predetermined correction color using the weight defined in the lip correction map, it is possible to obtain a face image in which the correction color is reflected on the lip.

The representative-color determining unit may sample a plurality of pixels located inside the lip region, and determine the representative color of the lip on the basis of a distribution of hues of the sampled pixels.

The representative color corresponding to the lip can be determined by sampling the plurality of pixels located inside the detected lip region. For example, a method of determining the representative color by averaging colors of the sampled plurality of pixels is conceivable. However, in this case, depending on detection accuracy of the lip region and the positions of the sampled pixels, pixels not sufficiently representing the color of the lip are sometimes mixed in samples. In order to prevent the mixing of the pixels, after the pixels are sampled, the representative color may be determined on the basis of the distribution of the hues. For example, a color allocated to a largest number of pixels may be set as the representative color. After a range of colors allocated to a large number of pixels is extracted, pixels belonging to the range may be re-sampled. Consequently, it is possible to exclude pixels unsuitable as the samples.

The representative-color determining unit may generate histograms representing the hues of the sampled pixels, and determine the representative color of the lip using only the pixels, the hues of which belong to a predetermined range centered on an average.

For example, pixels included in a predetermined percentile value centered on the average may be re-sampled and the representative color may be determined on the basis of a result of the re-sampling. Consequently, it is possible to determine a more appropriate representative color.

Note that the present invention can be specified as an image processing apparatus including at least a part of the units. The present invention can also be specified as an image processing method performed by the image processing apparatus. The present invention can also be specified as a computer program for causing a computer to execute the image processing method. The processing and the units can be freely combined and implemented as long as technical contradiction does not occur.

According to the present invention, it is possible to more naturally correct a color of a lip included in an image.

DESCRIPTION OF THE EMBODIMENTS

Preferred embodiments of the present invention are explained below with reference to the drawings.

Figure 1:
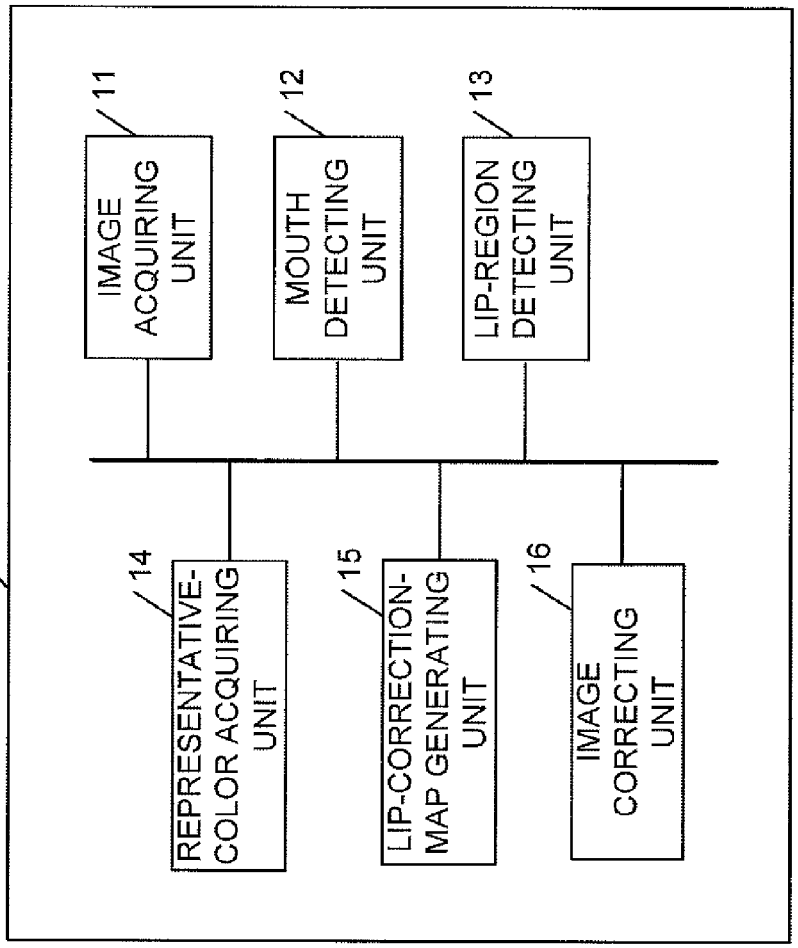
FIG. 1 is a system configuration diagram of an image processing apparatus according to an embodiment.

An image processing apparatus according to an embodiment is an apparatus that acquires an image including a face and corrects a color of a lip of a person included in the image. FIG. 1 is a system configuration diagram of an image processing apparatus 10 according to this embodiment.

First Embodiment

The image processing apparatus 10 according to a first embodiment includes an image acquiring unit 11, a mouth detecting unit 12, a lip-region detecting unit 13, a representative-color acquiring unit 14, a lip-correction-map generating unit 15, and an image correcting unit 16.

The image acquiring unit 11 is a unit that acquires a processing target image (an image including a face of a person; hereinafter, face image). Typically, the image acquiring unit 11 is a storage device such as a fixed disk drive or a flash memory. Note that the image acquiring unit 11 may be a unit (e.g., an interface device or a radio communication device) that acquires an image from the outside of the apparatus or may be a unit that picks up an image via a lens and an image pickup element. The processing target image may be an image corresponding to frames forming a moving image.

Note that, in this embodiment, a color space of the face image is YCbCr. However, the color space may be RGB, Lab, or the like.

The mouth detecting unit 12 is a unit that extracts a region corresponding to a mouth of the person from the face image acquired by the image acquiring unit 11. Specifically, the mouth detecting unit 12 detects feature points corresponding to the mouth of the person from the face image and, after specifying a region where the mouth is present, clips the region. The feature points to be detected are desirably points or the like representing the left end of the mouth, the right end of the mouth, and the boundary of the lip. In the following explanation, an image after the clipping is referred to as mouth image.

The lip-region detecting unit 13 is a unit that generates, on the basis of the feature points detected by the mouth detecting unit 12, a curve representing the boundary of the lip and generates a lip region, which is a region where the lip is present. The lip region can be generated by, for example, drawing, along the boundary line of the lip, a curve connecting a feature point corresponding to the left end of the mouth and a feature point corresponding to the right end of the mouth. For example, a plurality of points representing the boundary of the lip may be spline-interpolated to generate four curves in total respectively corresponding to upper and lower parts of the upper lip and upper and lower parts of the lower lip. A closed region representing the upper lip and a closed region representing the lower lip are generated by the curves generated in this way. In the following explanation, the two closed regions are referred to as lip region.

The representative-color acquiring unit 14 is a unit that acquires a color representing the lip included in the mouth image (hereinafter, representative color). Specifically, the representative-color acquiring unit 14 samples a plurality of pixels present inside the lip region and calculates a single representative color on the basis of a sampling result. A specific processing method is explained below.

The lip-correction-map generating unit 15 is a unit that generates a lip correction map on the basis of the lip region generated by the lip-region detecting unit 13 and the representative color acquired by the representative-color acquiring unit 14. The lip correction map is a map representing a weight used in correcting the color of the lip included in the face image and is a map that gives a larger weight to a place where the color should be more greatly corrected. That is, the lip correction map can also be considered a map representing likeliness as a lip. A specific processing method is explained below.

The image correcting unit 16 is a unit that performs correction for the face image using the lip correction map generated by the lip-correction-map generating unit 15. The correction performed by the image correcting unit 16 may be any correction as long as the color of the lip is corrected. For example, the correction may be correction for obtaining an effect of applying lipstick by combining a predetermined correction color with the lip included in the face image.

Note that the units explained above may be realized by exclusively designed hardware or may be realized by software modules. The units may be realized by a field programmable gate array (FPGA), an application specific integrated circuit (ASIC), or the like or may be realized by a combination of these.

When the units are configured as software, a computer program stored in an auxiliary storage device is loaded to a main storage device and executed by a CPU, whereby the units function. (None of the CPU, the auxiliary storage device, and the main storage device is shown in the figure.)

A unit that executes the computer program is not limited to the CPU and may be an image signal processor (ISP), a digital signal processor (DSP), a graphics processing unit (GPU), or the like.

Figure 2:
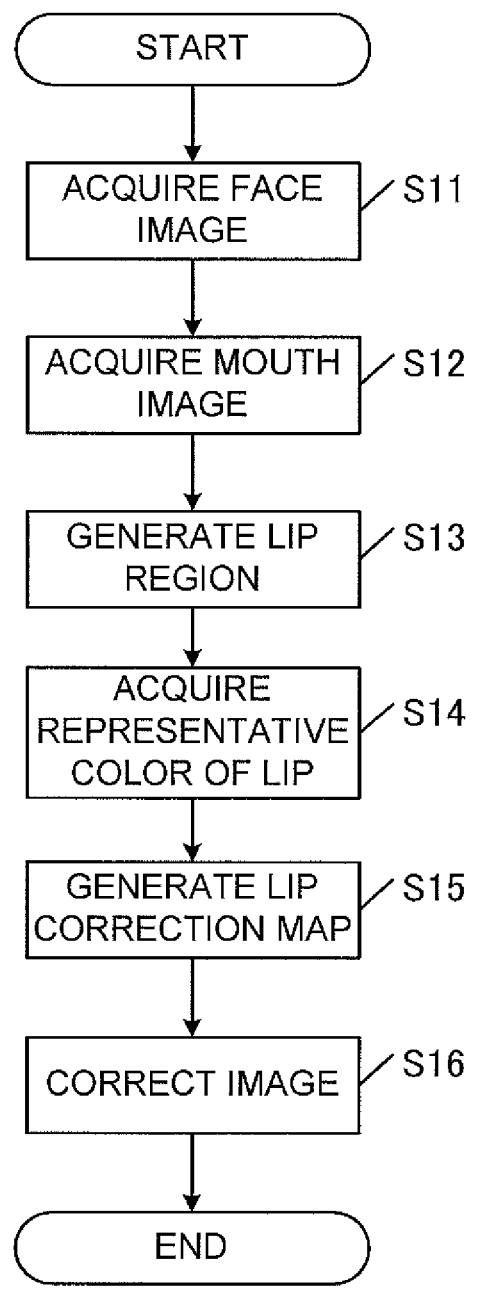
FIG. 2 is a flowchart of processing performed by the image processing apparatus.

Processing for correcting a color of a lip included in an acquired face image is explained in order with reference to FIG. 2, which is a flowchart of processing performed by the image processing apparatus 10. The processing shown in FIG. 2 is started on the basis of an instruction from a user of the apparatus.

First, the image acquiring unit 11 acquires a face image (step S11). In this embodiment, a face image stored in advance is acquired from a storage device. However, a face image may be acquired via a communication unit or an image pickup unit.

Figure 3:
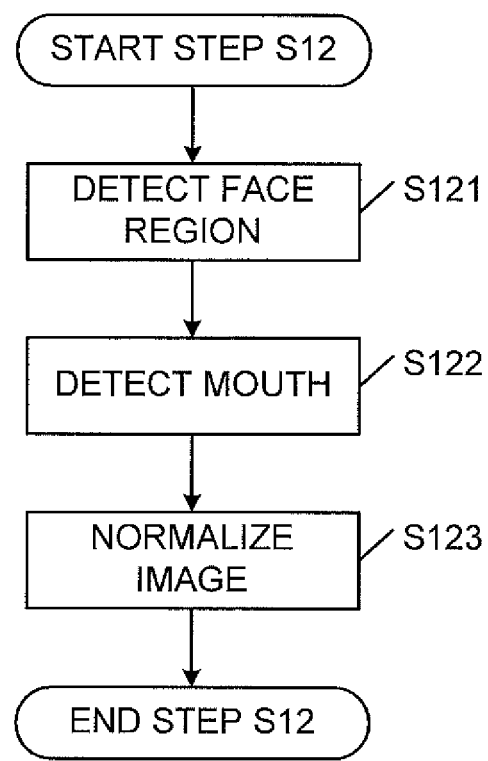
FIG. 3 is a flowchart for explaining, in detail, processing for generating a mouth image.

Subsequently, the mouth detecting unit 12 detects a region corresponding to a mouth from the acquired face image and clips the region to generate a mouth image (step S12). FIG. 3 is a flowchart for explaining, in detail, content of the processing performed in step S12.

First, in step S121, the mouth detecting unit 12 extracts a rectangular region corresponding to a face included in the image (hereinafter, a face region). A method of extracting a face region from an image is publicly known. Therefore, detailed explanation of the method is omitted.

Subsequently, in step S122, the mouth detecting unit detects the mouth included in the face region.

Specifically, the mouth detecting unit 12 detects, with a known method, feature points corresponding to the left end of the mouth, the right end of the mouth, the boundary of the lip, and the like. Note that, when failing in the detection of the feature points, after performing filtering, the mouth detecting unit 12 may detect the mouth and the lip through matching processing.

Subsequently, in step S123, the mouth detecting unit 12 performs normalization of the image. Specifically, the mouth detecting unit 12 clips the face region and generates a rectangular image having a predetermined size such that points at the left end and the right end of the mouth are placed in predetermined coordinates. In generating the rectangular image, the mouth detecting unit 12 may perform conversion of resolution using any interpolation method. When the mouth included in the face image is not horizontal, the mouth detecting unit 12 may perform the clipping after performing processing for rotating the mouth to be horizontal using affine transformation or the like.

Figure 4B:
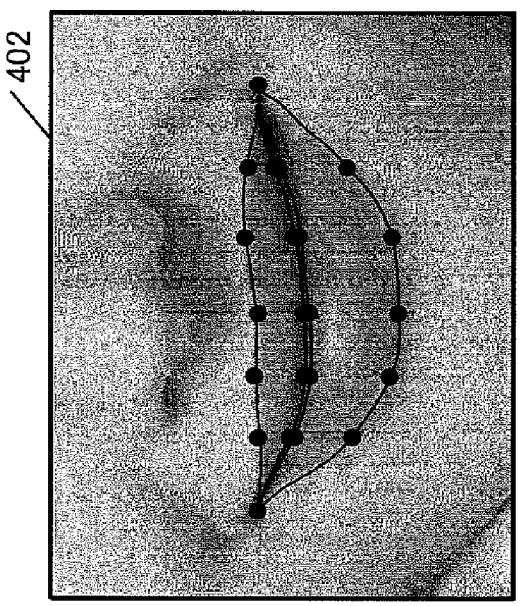
FIGS. 4A and 4B are examples of the mouth image and a lip region.
Figure 4A:
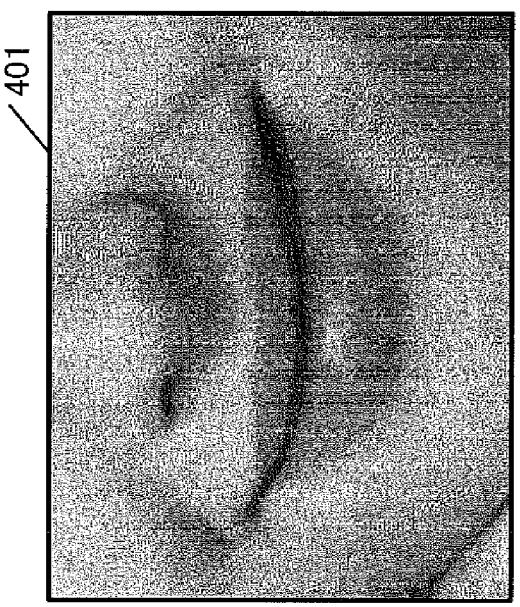

Note that the mouth image may be a color image or may be a set of a plurality of images in which color information is separated. For example, when a color space of the face image is YCbCr, a set of three images in which Y components, Cb components, and Cr components are respectively separated may be the mouth image. An image 401 shown in FIG. 4A is an example of the mouth image.

Subsequently, the lip-region detecting unit 13 generates a lip region on the basis of the feature points detected in step S122 (step S13).

First, the lip-region detecting unit 13 generates a spline curve starting from a feature point corresponding to the left end of the mouth and reaching a feature point corresponding to the right end of the mouth through a plurality of feature points corresponding to the upper side of the upper lip. Similarly, the lip-region detecting unit 13 generates a spline curve starting from the feature point corresponding to the left end of the mouth and reaching the feature point corresponding to the right end of the mouth through a plurality of feature points corresponding to the lower side of the upper lip. Consequently, a closed region corresponding to the upper lip is generated.

The lip-region detecting unit 13 generates a closed region corresponding to the lower lip according to the same method. As a result, a lip region including the region corresponding to the upper lip and the region corresponding to the lower lip shown in FIG. 4B is generated.

Note that, in this embodiment, the spline curves are generated using the feature points to generate the lip region. However, the lip region may be generated using other methods. For example, when the lip is detected by pattern matching, the lip region may be generated on the basis of a used pattern or may be generated using other methods.

Figure 5:
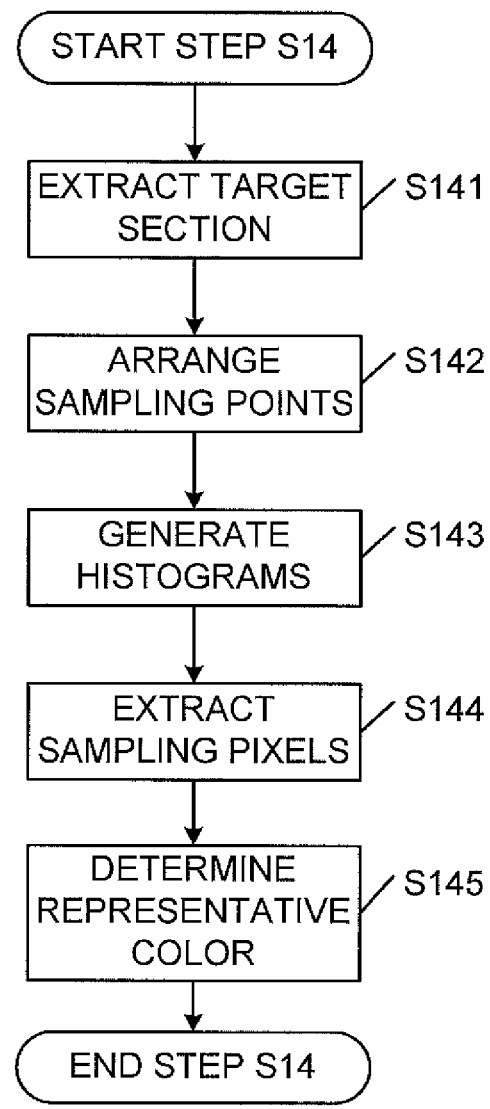
FIG. 5 is a flowchart for explaining, in detail, processing for determining a representative color.

Subsequently, the representative-color acquiring unit acquires a representative color, which is a color representing the lip, using the mouth image generated by the mouth detecting unit 12 and the lip region generated by the lip-region detecting unit 13 (step S14). FIG. 5 is a flowchart for explaining, in detail, content of the processing performed in step S14.

Figure 6:
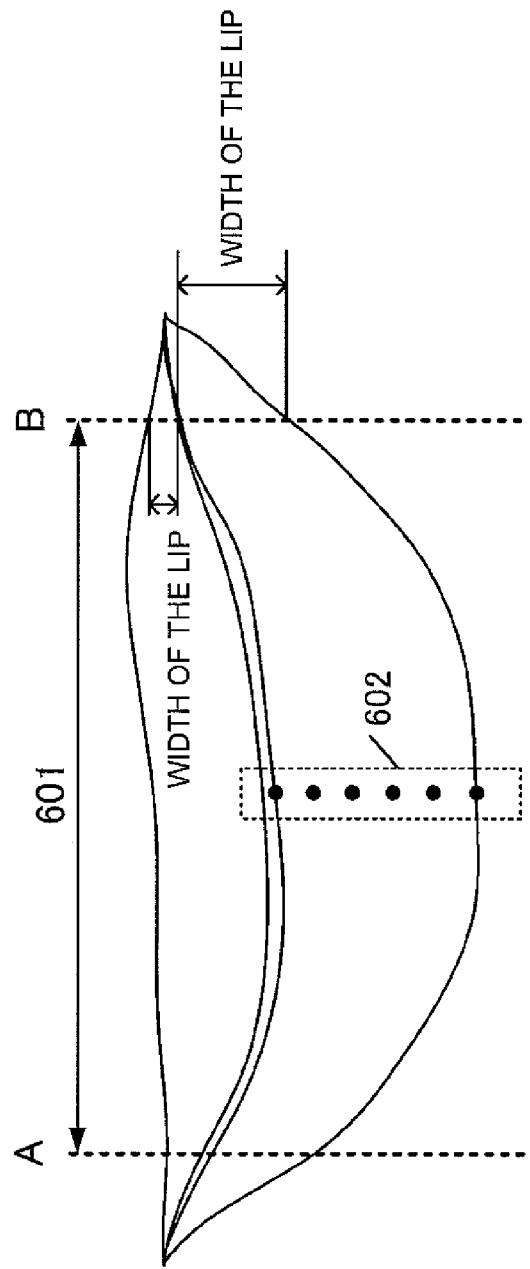
FIG. 6 is a diagram for explaining processing for sampling pixels.

First, the representative-color acquiring unit 14 sets a scanning line traversing the lip in the up-down direction and extracts, while moving the scanning line in the lateral direction, a section in which both of the width of the upper lip and the width of the lower lip are equal to or larger than a predetermined width (step S141). In FIG. 6, dotted lines in the longitudinal direction indicate the scanning line. A section indicated by reference numeral 601 surrounded by a scanning line A and a scanning line B is the extracted section.

Note that the predetermined width only has to be width sufficient for sampling pixels in step S142 explained below. For example, when six pixels are sampled in each of the upper lip and the lower lip, the predetermined width may be set to six pixels.

Subsequently, the representative-color acquiring unit 14 arranges sapling points in each of the upper lip and the lower lip (step S142). In this example, the extracted section is divided into nineteen and twenty lines are set. Then, for each of the lines, six sampling points are arranged in each of the upper lip and the lower lip. Reference numeral 602 denotes an arrangement example of the sampling points in the lower lip. In this example, since the six sampling points are arranged in each of the upper and lower lips (twelve sampling points in total) for each of the lines, 240 sampling points in total are arranged in the twenty lines. Note that the sampling points are arranged to overlap the pixels.

Subsequently, the representative-color acquiring unit acquires Y components, Cb components, and Cr components for the respective pixels on which the sampling points are arranged and generates histograms of values of the respective components (step S143).

Subsequently, the representative-color acquiring unit 14 calculates averages μ, for the generated three histograms, extracts only pixels in which all of the three values belong to a predetermined range centered on the averages, and sets the pixels as sampling pixels (step S144). For example, when a standard deviation is represented as σ and the predetermined range is represented as ±2σ, only sampling pixels in which all of the Y components, the Cb components, and the Cr components are present in the range of ±2σ centered on the averages are extracted.

Subsequently, in step S145, the representative-color acquiring unit 14 determines a representative color of the lip using the extracted sampling pixels. The representative color can be determined using the averages of the Y components, the Cb components, and the Cr components of the sampling pixels. However, the representative color may be determined using other methods.

According to the processing explained above, the representative color corresponding to the lip region is determined.

Figure 7:
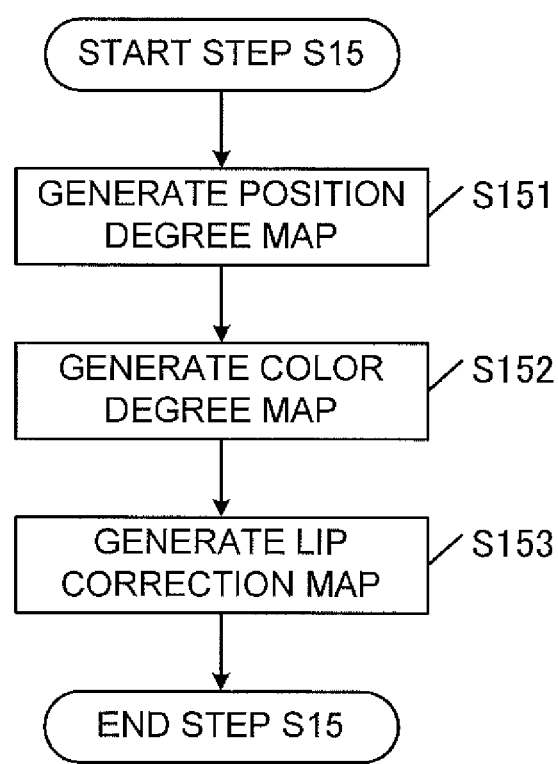
FIG. 7 is a flowchart for explaining, in detail, processing for generating a lip correction map.

Subsequently, the lip-correction-map generating unit generates a lip correction map using the lip region generated in step S13 and the representative color acquired in step S14 (step S15). FIG. 7 is a flowchart for explaining, in detail, content of the processing performed in step S15.

First, in step S151, the lip-correction-map generating unit 15 generates a position degree map. The position degree map is a kind of a map representing a weight used in correcting the color of the lip and is a map to which a value of 256 gradations is given on the basis of the distance between the target pixel and the lip region.

The value of the position degree map is the maximum (255) inside the lip region and is attenuated (decreases) toward 0 as the target pixel is further away from the lip region. The attenuation is desirably steep inside the mouth and gentle outside the mouth.

Figure 8:
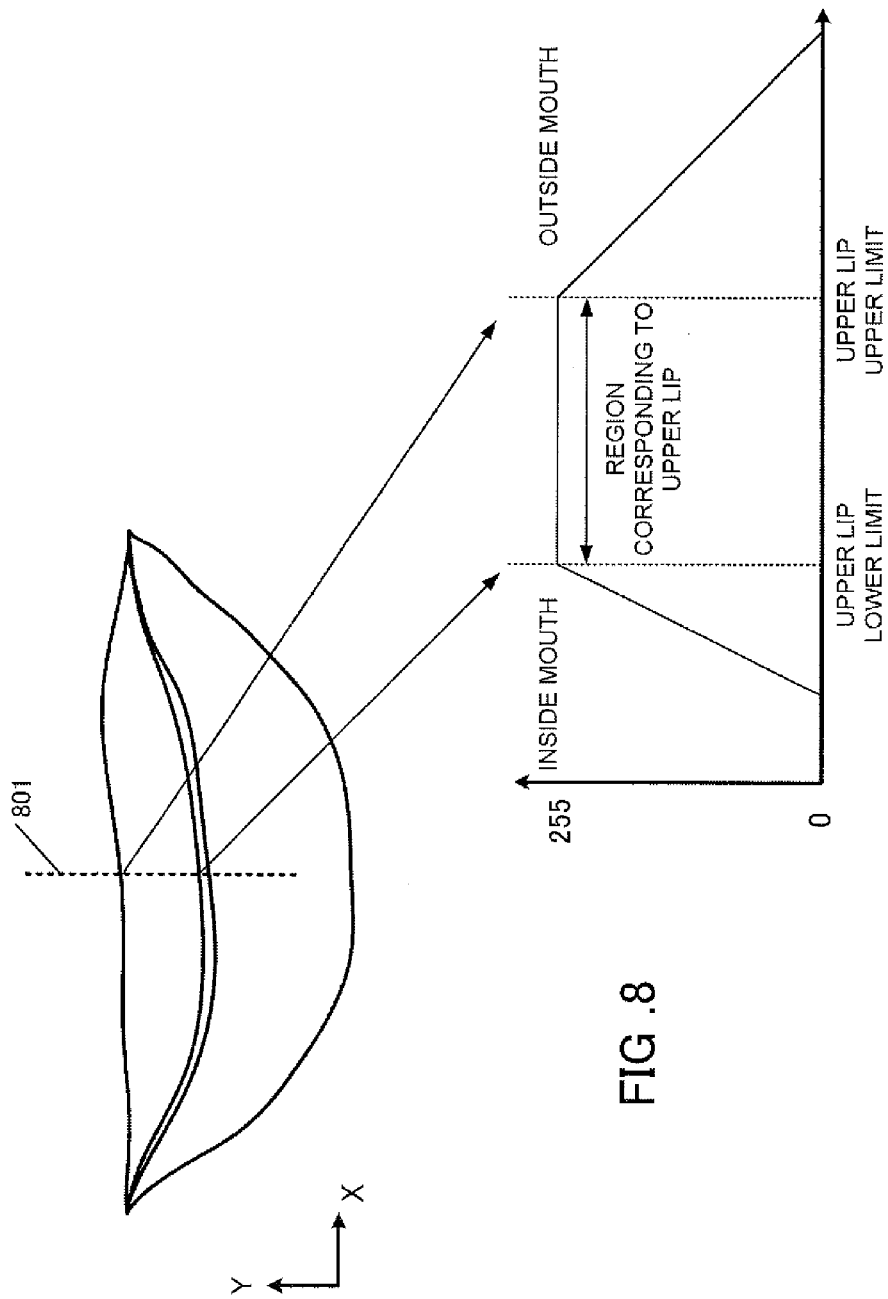
FIG. 8 is a diagram for explaining a position degree map.

FIG. 8 is a diagram representing the attenuation of the value of the position degree map. The abscissa of the graph corresponds to a Y coordinate on a line (reference numeral 801) traversing the lip in the longitudinal direction. The ordinate of the graph represents the value allocated to the map. As it is seen from FIG. 8, in this embodiment, different attenuation rates are set outside the mouth and inside the mouth. In this example, an attenuation degree is set such that, when the width of the lip is represented as m, above the upper lip (outside the mouth), a value is 0 at a distance of m and, below the upper lip (inside the mouth), the value is 0 at a distance of m/2.

Note that, although only the upper lip is shown in FIG. 8, the attenuation degree for the lower lip is the same except that the region above the lower lip corresponds to the inside of the mouth, and the region below the lower lip corresponds to the outside of the mouth. Naturally, the attenuation degree may be other than the attenuation degree shown in the figure.

In this step, distances are calculated from the lip region for all the pixels included in the mouth image to generate the position degree map.

Subsequently, in step S152, the lip-correction-map generating unit 15 generates a color degree map. The color degree map is a kind of a map representing a weight used in correcting the color of the lip and is a map to which a value of 256 gradations is give on the basis of similarities of colors to the representative color.

The value of the color degree map is larger as the target pixel is more similar to the representative color. When a Cb component of the target pixel is represented as $Cb_x$, a Cr component of the target pixel is represented as $Cr_x$, a Cb component of the representative color is represented as $Cb_1$, and a Cr component of the representative color is represented as $Cr_1$, similarity $sc_x$ of a color is represented by Expression (1). The color degree map is a map obtained by reallocating the obtained similarity $sc_x$ to the range of 0 to 255. The value of the color degree map is 255 when the color is the same and is 0 when the difference of the hue is the maximum.

In this step, similarities to the representative color are calculated for all the pixels included in the mouth image to generate the color degree map.

[Math. 1]

$$sc_x=(255-|Cb_x-Cb_1|)+(255-|Cr_x-Cr_1|) \qquad \text{Expression (1)}$$

Note that Expression (1) is an example adopted when the pixels included in the mouth image are 256 gradations. However, gradations may be other than 256. The similarity $sc_x$ may be calculated by other methods as long as the similarity $sc_x$ is a value quantitatively representing similarity to the representative color. For example, in this example, absolute values of differences of color components are totaled. However, the absolute values of the differences of the color components may be multiplied together. Further, for example, squares of the differences may be used rather than the absolute values of the differences.

Subsequently, the lip-correction-map generating unit 15 integrates the lip position degree map generated in step S151 and the color degree map generated in step S152 to generate a lip correction map (step S153). The lip correction map is a map obtained by multiplying the value of the lip position degree map by the value of the color degree map and reallocating an obtained value to the range of 0 to 255.

The lip correction map generated in this way is generated on the basis of both of the distance from the lip region and the similarity of the color to the representative color.

The generated lip correction map is transmitted to the image correcting unit 16. The image correcting unit 16 executes, using the acquired lip correction map, processing for correcting the color of the lip included in the face image (step S16).

Specifically, the image correcting unit 16 combines a correction color with a pixel value of the face image using, as a weight, the value defined in the lip correction map and writes back a pixel value after the combination to the face image. Note that, when the face image is separated into a plurality of channels of a Y component, a Cb component, a Cr component, and the like, after applying the processing only to the channels representing hues (the Cb component and the Cr component), the image correcting unit 16 only has to integrate the plurality of channels.

A corrected image is stored in a not-shown storage device or transmitted to the outside and provided to the user.

As explained above, the image processing apparatus according to this embodiment corrects, after generating the lip correction map on the basis of both of the map representing the distance from the detected lip region and the map representing the similarity to the representative color corresponding to the lip region, the color of the lip using the lip correction map as a weight. Consequently, even when there is an individual difference in the shape and the color of the lip, it is possible to perform natural correction.

Second Embodiment

In the first embodiment, in step S152, the color degree map is generated using the expression (Expression 1) in which a value linearly increases as a sum of the similarity of the Cb component and the similarity of the Cr component of the mouth image increases. On the other hand, a second embodiment is an embodiment in which, as the intensity of a component of red of a pixel included in a mouth image increases, a weight for the pixel is set larger.

The configuration of an image processing apparatus according to the second embodiment is the same as the configuration in the first embodiment except that processing performed by the lip-correction-map generating unit 15 is partially different.

In the second embodiment, in the processing in step S152, a color degree map is generated using similarity $sc_x$ determined using Expression (2). In the expression, $\alpha$ is a value that increases as the intensity of a component of red of a target pixel increases (i.e., $Cr_x$ is larger). For example, $\alpha$ can be set as $\alpha = Cr_x/255$.

[Math. 2]

$$sc_x = \alpha \times (255 - |Cb_x - Cb_1|) + (255 - |Cr_x - Cr_1|) \quad \text{Expression (2)}$$

In the second embodiment, as in the first embodiment, the color degree map having the value in the range of 0 to 255 is generated. However, a weight is given to perform correction more greatly for a pixel having more intense red. Consequently, it is possible to obtain a sharp correction result.

Note that, in this embodiment, a color space of the face image is YCbCr. However, the color space may be other than YCbCr. The color degree map may be generated using a method other than the illustrated method if the value of the map can be set larger as the hue of the target pixel is closer to red. For example, the result obtained by Expression (1) may be multiplied by $\alpha$. Similarly, a definition method for $\alpha$ is not limited to the illustrated method either.

Modifications

The embodiments explained above are only examples. The present invention can be changed and carried out as appropriate without departing from the spirit of the present invention.

For example, the intensity of the correction may be able to be adjusted by further multiplying the generated lip correction map by a correction coefficient.

In the explanation of the embodiment, the image processing apparatus that applies the processing to the image stored in the storage device is explained as the example. However, the image does not always have to be acquired from the storage device and, for example, may be acquired from the outside of the apparatus via a wired or wireless network.

The present invention may be carried out as an image pickup apparatus having a function of correcting a color tone of a lip by combining an image pickup unit that picks up an image and the image processing apparatus.

What is claimed is:

1. An image processing method performed by an image processing apparatus that generates, on the basis of a face image which is an image including a face of a person, a lip correction map representing a distribution of weights used in correcting a color of a lip included in the face image, the image processing method comprising the steps of:

acquiring the face image;

extracting a lip region, which is a region corresponding to the lip, from the face image;

determining a representative color of the lip using pixels located inside the lip region;

acquiring, for each pixel included in the face image, a first value representing a proximity to the lip region and a second value representing similarity of a color to the representative color; and generating the lip correction map on the basis of distributions of the first values and the second values.

2. An image processing apparatus comprising:

an image acquiring unit configured to acquire a face image, which is an image including a face of a person;

a lip extracting unit configured to extract a lip region, which is a region corresponding to a lip, from the face image;

a representative-color determining unit configured to determine a representative color of the lip on the basis of pixels included in the lip region;

a value acquiring unit configured to acquire, for each pixel included in the face image, a first value representing a proximity to the lip region and a second value correlated to similarity of a color to the representative color;

a lip-correction-map generating unit configured to generate, on the basis of distributions of the first values and the second values, a lip correction map representing a distribution of weights used in correcting a color of the lip included in the face image; and an image correcting unit configured to correct the color of the lip included in the face image using the lip correction map.

3. The image processing apparatus according to claim 2, wherein each of the second values is a value obtained by multiplying the similarity of the color to the representative color by a predetermined weight, and the predetermined weight increases as an intensity of a component of red of a target pixel increases.

4. The image processing apparatus according to claim 2, wherein each of the first values is a value that is attenuated as a target pixel is further away from the lip region, and the attenuation inside a mouth is steeper than the attenuation outside the mouth.

5. The image processing apparatus according to claim 2, wherein the image correcting unit combines a predetermined correction color and hues of pixels of the face image using a weight defined in the lip correction map.

6. The image processing apparatus according to claim 2, wherein the representative-color determining unit samples a plurality of pixels located inside the lip region, and determines the representative color of the lip on the basis of a distribution of hues of the sampled pixels.

7. The image processing apparatus according to claim 6, wherein the representative-color determining unit generates histograms representing the hues of the sampled pixels, and determines the representative color of the lip using only the pixels, the hues of which belong to a predetermined range centered on an average.

8. A non-transitory computer readable storing medium recording a computer program for causing a computer to execute each of the steps of the image processing method according to claim 1.

* * * * *